July 11, 1939.　　　　H. CAPDET　　　　2,165,222
ENGINE AND ENGINE COMPRESSOR
Filed May 28, 1934　　　　2 Sheets-Sheet 1

H. Capdet
INVENTOR

By: Marks & Clerk
Atty's.

Patented July 11, 1939

2,165,222

UNITED STATES PATENT OFFICE 2,165,222

ENGINE AND ENGINE COMPRESSOR

Henri Capdet, Toulouse, France

Application May 28, 1934, Serial No. 728,040
In France June 3, 1933

1 Claim. (Cl. 123—56)

The present invention relates to internal combustion engines, and especially to internal combustion engines including two cylinders in line with each other and disposed in opposite relation with respect to each other, the pistons cooperating with said cylinders respectively being rigidly connected together through a common piston rod.

Up to now, in internal combustion engines, it has always been endeavoured to discharge as much as possible of the burned gases present in the cylinder during the exhaust stroke into the atmosphere. The reason for this was that these burned gases were considered as detrimental of the good working of the engine if a substantial amount of these gases remained in the cylinder after the exhaust stroke.

The object of the present invention is to take advantage of these burned gases for obtaining very high pressures of the fuel mixture in the cylinder without increasing the amount of fresh gases fed to said cylinder. Up to now, in most engines, high pressures could only be obtained by increasing the amount of fresh gases fed to the engine, by means of suitable compressors, for instance turbo-compressors.

The device according to the present invention comprises means for retaining in the cylinder, at the end of the exhaust stroke, a portion of the burned gases; said portion occupying, at a very high temperature and under a pressure slightly higher than that of the medium into which the burned gases are exhausted, a volume substantially equal to the maximum cylinder capacity. Means are further provided for injecting into the burned gases thus retained in said cylinder, by means of a suitable compressing device, a certain amount of air and fuel (or air alone if the fuel is to be injected separately) when the piston is close to the end of its outward stroke, whereby the mixture of air, fuel, and burned gases is then compressed, starting from a pressure and temperature much higher than those of the surrounding medium, without having increased the amount of air and fuel injected into the cylinder. With such an arrangement the pressure after explosion or combustion is much higher than the usual pressures obtained.

Figure 1:
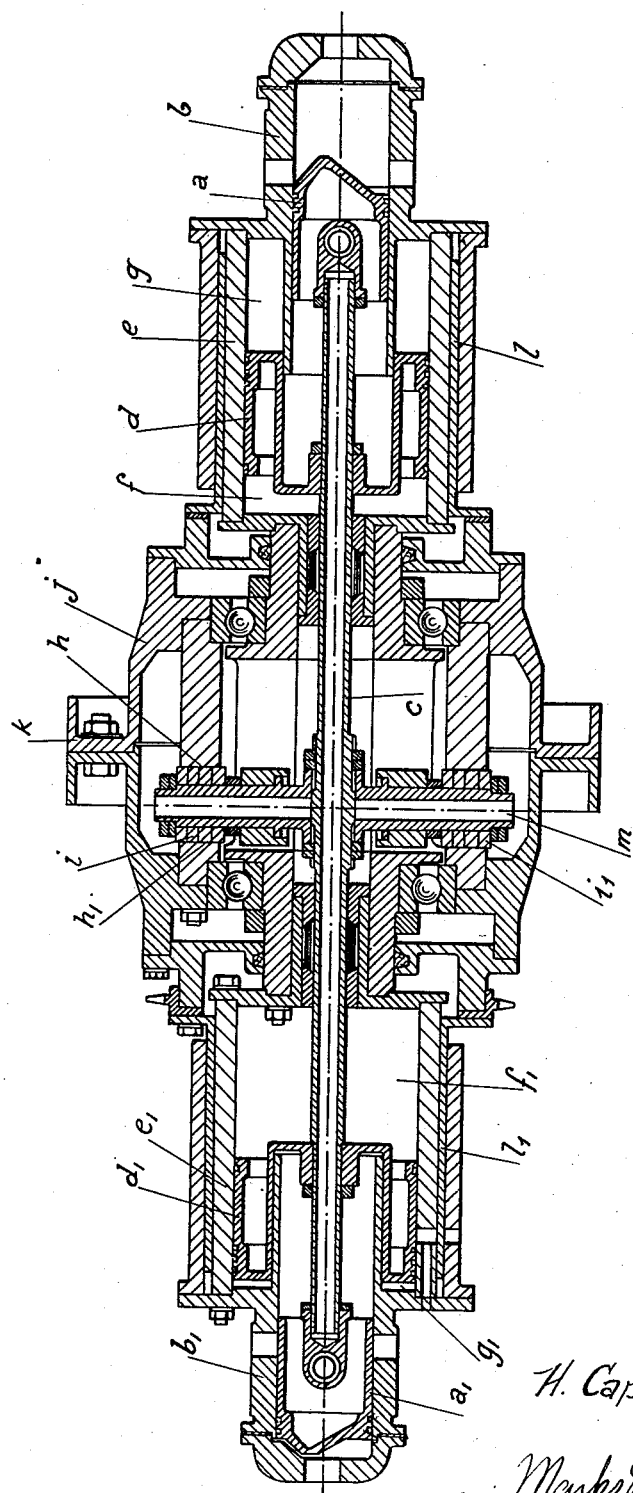
Figure 2:
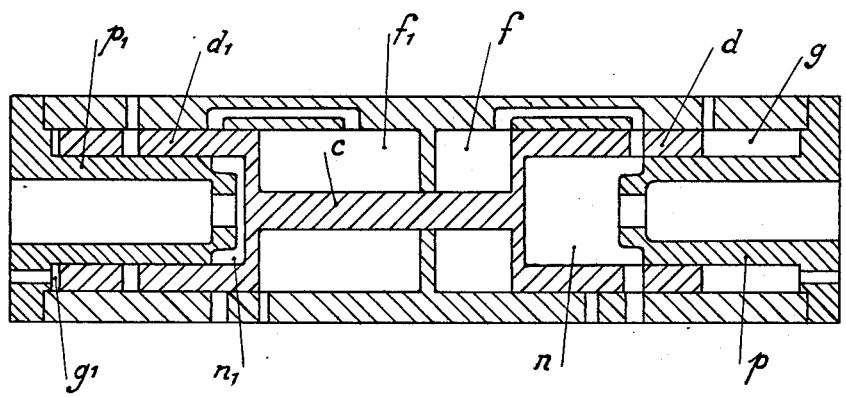
Figure 3:
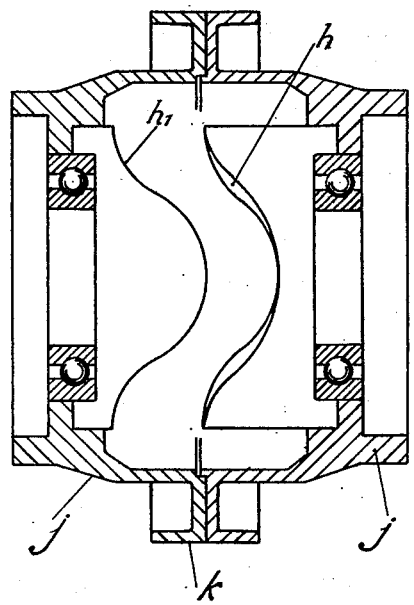

In the accompanying drawings Figures 1 and 2 illustrate, diagrammatically and by way of example, an axial section of two embodiments of an engine which functions in accordance with the cycle of the present invention. Figure 3 is a view of the sonoidal tracks shown in section in Figure 1.

The piston $a$, working in the engine cylinder $b$, is connected by means of its rod $c$, with a piston $d$ of larger diameter, working in a compressor cylinder $e$. The pre-compression chamber of this latter is located at $f$, and the chamber $g$, located on the opposite face of said piston $d$, may be open to the atmosphere, or arranged to compress the air, or a gas, independently of the chamber $f$. It will be understood that this latter chamber is provided with the desired intake orifice for atmospheric air or of a mixture supplied by a carburettor (not shown) and with the delivery orifice, connected by any suitable conduit, with the admission port of the engine cylinder $b$. Said orifices and conduits being of any usual type are represented in a merely diagrammatical manner.

For the hereinafter explained compensating of the inertia of the moving masses by the pressures, an apparatus symmetrical with that described is coupled, by the same piston rod $c$ with above apparatus, and arranged to function at a relative angle thereto of 180°. Identical parts are denoted by the same reference characters, with the index 1. In addition, the rod $c$ of said pistons carries a perpendicular spindle $m$, on which are seated rollers $ii_1$ running on tracks $hh_1$ (see Fig. 3) disposed in accordance with a sinoidal curve enabling the reciprocating rectilinear movement of the pistons to be transformed into a continuous rotational movement of a cylinder $j$. A sleeve valve $l$ may be connected with said cylinder and be provided with the desired ports for ensuring the admission of fluid to the pre-compression chamber $f$ and the compression chamber $g$ (if necessary), and also the transfer of the contents of the pre-compression chamber to the working cylinder $b$, the discharge from the compression chamber $g$ (if necessary) and the exhausting of the burned gases.

Towards the end of the expansion and at the end of the exhausting, a portion of the burned gases is retained in the cylinder, and occupies a volume approximately equal to the cubic capacity of the cylinder. The temperature of said gases is very high, because they result from the preceding explosion or ignition at high temperature. Their pressure is slightly higher than that of the surrounding atmosphere, for example 1.1 kg. absolute. The quantity of said gases is therefore relatively small.

During the expansion or working stroke of the piston, the air or mixture of air and fuel, has been compressed in the pre-compression chamber $f$, for example, to 1.9 kg. After shutting off all communication between the cylinder $b$ which is to be charged and the surrounding medium, and when the piston $a$ has nearly reached its lower dead point, a quantity of said pre-compressed air, or mixture, is introduced into the cylinder $b$. The degree of pre-compression should be sufficient to ensure the penetration of the fresh mixture, or air only, into the burned gases contained in the working cylinder, whilst preventing spontaneous ignition when air and fuel are jointly brought into contact with the burned gases.

Such spontaneous ignition can also be prevented by disposing metallic gauze (such as that used in Davy lamps) in the pipe connecting the pre-compression chamber with the working cylinder. With the same object, said pipe may also comprise concentric rings.

The heat due to pre-compression, the heat of the walls and the heat contained in the retained burned gases, are utilised to vaporise the major portion of the fuel contained in the indrawn mixture. Any considerable loss of fresh gas through the exhaust ports should be prevented by closing the communication between the working cylinder and the surrounding medium during the admission of the fresh gases into said cylinder.

The compression in the engine cylinder thus begins at a very much higher temperature and pressure than those of the surrounding medium, without the weight of the mixture being greater than in the usual engines. For example, if the mixture be admitted at 300° C. absolute temperature, into the burned gases with an absolute temperature of 1500° C., the initial temperature will be 480° C. absolute, at a pressure of 1.7 kg. absolute. This result is obtained without employing any mechanical apparatus, such as an exhaust-gas turbine driving an air or mixture compressor, which apparatus would introduce a large quantity of matter under a higher pressure than that of the surrounding medium, but with a temperature barely exceeding that of said medium.

Under certain conditions, in order to prevent spontaneous ignition, air alone may be introduced into the burned gases, the fuel being injected when the temperature of said mixture of air and burned gases has reached a suitable level (for example 480° C. absolute, as above). With the present cycle that injection is made while the mixture is still under a low pressure (about 2 kg. absolute).

When the mixture attains the desired pressure during the compression period, the combustion or explosion is initiated either by indirect means (magnetos, sparking plugs or the like) or directly (spontaneous ignition). This latter ignition is obtained by reason of the high initial temperature (480° C. absolute, in the example given), by the aid of a volumetric pressure ratio much lower than that in high-compression apparatus. In the latter, the ratio should be for example, 15, whereas in the example given, with a compression ratio of 5, the mixture attains a pressure of (for example) 13.6 kg., absolute, and a temperature of 740° C. absolute.

The explosion or combustion pressures after ignition are thus much higher than the usual pressures, being, for example, 80 kg. absolute in the example given. The entire engine cycle proceeds, therefore at higher pressures, enabling a higher velocity to be imparted to the piston with the admission of smaller quantities of gas. However, in order to prevent these high pressures from affecting adversely the mechanical connections, it is necessary that the inertia of the masses in reciprocating movement should be of an order of dimensions comparable with that of the pressures, and should act along the same axis.

The alleviation of the stresses on the mechanical connections is obtained by the opposition of the rigid connection of the two opposed pistons and by the fact that an explosion is produced at each end of the stroke of the one or the other of the two pistons. The rollers $ii_1$ connected with the rod $c$ of the pistons run on tracks $hh_1$ which are of the sinoidal form described in the specification of my British Patent No. 304,701, of January 24, 1928, in such a manner that the rectilinear reciprocating movement of the pistons proceeding in accordance with a sinoidal law of the angle of rotation, produces the continuous rotation of the cylinder $j$ and the members attached thereto, such as a pulley $k$. Owing to the fact that the pressures in the cylinders and the forces of inertia of the unit formed by the two pistons and the parts connected therewith, changing their position in accordance with the said sinoidal law, act in a straight line and in the same or opposite direction, the resultant of the pressures and the forces of inertia is practically nil, or is reduced very considerably in the case in which a gas is compressed in the compression chamber $g$. Consequently very high velocities can be imparted to the pistons, an effect which has not been attainable in the usual engines or compressors without a considerable charge. The thrusts exerted by the pistons on the tracks $hh_1$ are transmitted to a driving pulley $k$ or other transmission member, in the case of an engine without a compressor, or—when compression is effected in the chambers $gg_1$—to a flywheel, mounted in the place of the pulley $k$ for the purpose of equalizing any irregularities which might occur in the running.

Instead of being of strictly sinoidal form, the tracks may be of such a shape that the law of linear displacement of the pistons provides accurate compensation between their inertia and the pressures acting on them in the various portions of their stroke. The resulting pressures on the tracks in the engine-compressor are then nil in all positions of the reciprocating mass when the flywheel turns with uniform speed.

The machining of the tracks is then effected by a machine comprising a cam or cams rotating between two parallel plates firmly connected with a cylinder bearing the track to be cut out, to which cylinder is imparted a rotary movement, the speed of which is in a definite ratio to the rotary movement of the cam or cams which, by bearing against the flat faces of the plates, alternately produce the reciprocatory movement of the cylinder. A machine of this type is described for instance in my Letters Patent No. 1,903,027 of the United States. The cams having a circular contour are however replaced by cams having another suitable contour such that during rotation the distance between the two parallel plates, is invariable, said contour being adapted to produce the form of the tracks to be obtained.

By the provision of a compression chamber, such as $g$, on that face of the piston which is remote from the precompression chamber $f$, the machine is constructed as a compressor combined in the same apparatus as the engine and having the same piston rod.

The evacuated gases may be utilised in the case of the engine-compressor, to heat the compressed air enclosed in the control tanks. In this manner some of the heat units contained in said gases are recovered through the increase in temperature, and consequent pressure, of the compressed air produced by the engine-compressor.

The various arrangements and also the relative dimensions of the parts of the engine-compressor, their distribution devices and mechanical connections, may vary.

The device transforming the reciprocating movement of the pistons into the rotational movement of the pulley $k$ by the aid of tracks $hh_1$, may be replaced by any device producing an alternating sinoidal acceleration of the pistons, as a function of the rotational angle of the pulley (such as a link apparatus, or the La Hire sinoidal device with circle rolling inside a circle of double its diameter) or by any other device producing an alternating acceleration in accordance with diagrams for the complete balancing of the mechanical connections.

The modified construction of the engine or engine-compressor, shown in Figure 2, is specially designed to reduce the length of the whole. Instead of being at the end, the explosion or combustion cylinder, is formed by the interior of the annular piston $d$ of the compressor. The pre-compression chamber is again at $f$, the compression chamber is at $g$, and $n$ is the combustion chamber. The breech common to this chamber and the compression chamber carries a nose $p$ forming a stationary piston of the combustion chamber. The mode of action is the same as in the case of the engine shown in Figure 1.

The symmetrical apparatus comprises the similar parts $f_1$, $g_1$, $n_1$, $p_1$, acting at 180° in relation to those already mentioned, the piston $d_1$ being connected with the piston $d$ by the rod $c$ common to both. When the machine operates as a compressor, the flywheel pulley ($k$ in Figure 1) may be dispensed with, and also the tracks ($hh_1$) for transforming the movement (just as in the case of Figure 1). Starting is then effected by means of any device imparting, at the outset a longitudinal movement to the piston rod $c$. Of course, however, the machine shown in Figure 2 may also comprise the flywheel and the same device for the transformation of movement as the machine of Figure 1. The flywheel is utilised for starting, and for the various controls, valves, distributions and so on; it enables the machine to work solely as an engine when the compression in the chambers $gg_1$ is put out of operation.

Owing to the excess heat, the interior chambers $nn_1$ facilitate the vaporisation of the fuel, such as gas oil. This heat, which is almost completely absorbed in this manner, no longer affects adversely the output of the compressor.

For suppressing completely the vibrations applied directly to the frame and transmitted by the fixed portion of the engine, similar units to those shown in Figure 1 or Figure 2 may be provided and disposed in such a manner as to neutralize the effects of inertia on the frame, and furnishing perfect balancing.

The rollers $ii_1$ shown in Figure 1 are divided into several discs loose on their axis and independent of each other. If the roller were in one piece, when its inner portion rolls on the guide track $h$ or $h_1$, its outer portion would slide on said track. The roller being divided, the extent of sliding of each disc from one side to the other side is considerably reduced.

What I claim is:

An internal combustion engine which comprises, in combination, two cylinders mounted in line with each other in opposite relation, each cylinder having three working chambers, one for combustion, one for pre-compression of the charge supplied to the combustion chamber, and the third for compression of a fluid separate from the charge, a piston in each of said cylinders, each piston having three operating faces corresponding with the three chambers of the corresponding cylinders, respectively, and means for rigidly interconnecting said two pistons, said cylinders forming a single casing provided at each end with an inwardly extending cylindrical projection leaving an annular space between itself and the inner wall of the corresponding cylinder and provided in its intermediate part with a partition having a hole formed therein, said pistons being hollow and open at their outer ends so as to fit in said annular space, said interconnecting rigid means consisting of a rod fitting slidably in the hole of said partition, whereby each combustion chamber is formed between each of said projections and the inside of the corresponding piston end, each fluid compression chamber is formed by the annular space around each of said projections, as limited by the outer edge of the corresponding piston end, and each pre-compression chamber is formed between said partition of the casing and the rear face of each of said piston ends respectively, said casing and said hollow piston ends being provided with ports and at least one passage for interconnecting said chambers.

HENRI CAPDET.